United States Patent
Mueller et al.

(10) Patent No.: US 10,962,998 B2
(45) Date of Patent: Mar. 30, 2021

(54) MEASURING ARRANGEMENT WITH A CONTROL UNIT AND METHOD FOR OPERATING SUCH A MEASURING ARRANGEMENT

(71) Applicant: VEGA GRIESHABER KG, WOLFACH, Wolfach (DE)

(72) Inventors: Tobias Mueller, Lauterbach (DE); Holger Staiger, Hardt (DE)

(73) Assignee: VEGA GRIESHABER KG, Wolfach (DE)

( * ) Notice: Subject to any disclaimer, the term of this patent is extended or adjusted under 35 U.S.C. 154(b) by 323 days.

(21) Appl. No.: 16/016,276

(22) Filed: Jun. 22, 2018

(65) Prior Publication Data
US 2019/0086944 A1 Mar. 21, 2019

(30) Foreign Application Priority Data
Sep. 21, 2017 (DE) ...................... 10 2017 121 923.4

(51) Int. Cl.
| G05F 1/625 | (2006.01) |
| G05B 19/042 | (2006.01) |
| H04B 3/54 | (2006.01) |
| G05B 21/02 | (2006.01) |
| H04L 29/08 | (2006.01) |

(52) U.S. Cl.
CPC ......... G05F 1/625 (2013.01); G05B 19/0428 (2013.01); G05B 21/02 (2013.01); H04B 3/548 (2013.01); G05B 2223/06 (2018.08); H04L 67/12 (2013.01)

(58) Field of Classification Search
CPC ..................................................... G05F 1/625
USPC .......................................................... 702/188
See application file for complete search history.

(56) References Cited

U.S. PATENT DOCUMENTS

| 7,991,582 B2 * | 8/2011 | Longsdorf | ........... G05B 23/027 702/183 |
| 2009/0253388 A1 * | 10/2009 | Kielb | ................... G08C 17/02 455/117 |
| 2011/0134817 A1 * | 6/2011 | Probst | ................ G05B 19/0423 370/311 |
| 2012/0179423 A1 * | 7/2012 | Robl | .................... G05B 19/408 702/188 |

(Continued)

FOREIGN PATENT DOCUMENTS

DE 102008036967 A 8/2008

OTHER PUBLICATIONS

GPTO office action for related German application 10 2017 121 923.4 dated May 17, 2018.

Primary Examiner — Ricky Ngon
(74) Attorney, Agent, or Firm — William Gray Mitchell (57) ABSTRACT

A measuring arrangement with a control unit, an energy supply unit for a plurality of two-line field devices, which apply a predetermined current upon a measuring loop in which the two-line field devices are respectively arranged, with the two-line field devices being electrically connected to the energy supply unit and communicating digitally with the control unit, with the energy supply unit comprising a voltage controller, which controls an output voltage depending on the number the means of the measuring arrangement for determining a number of two-line field devices operated in the measuring arrangement.

13 Claims, 3 Drawing Sheets

(56) References Cited

U.S. PATENT DOCUMENTS

| | | | |
|---|---|---|---|
| 2013/0082667 A1* | 4/2013 | Sinreich | H02J 7/345 |
| | | | 323/234 |
| 2013/0179697 A1* | 7/2013 | Nicholas | G06F 1/263 |
| | | | 713/300 |
| 2014/0070609 A1 | 3/2014 | Fiedler et al. | |
| 2015/0002111 A1* | 1/2015 | Brudermann | H02M 3/156 |
| | | | 323/265 |
| 2015/0094988 A1* | 4/2015 | Schumacher | G01M 99/00 |
| | | | 702/188 |
| 2016/0341767 A1* | 11/2016 | Nyberg | G01R 29/00 |
| 2017/0250733 A1* | 8/2017 | Henderson | H04B 3/54 |
| 2017/0264295 A1* | 9/2017 | Slattery | H03K 19/17764 |

* cited by examiner

MEASURING ARRANGEMENT WITH A CONTROL UNIT AND METHOD FOR OPERATING SUCH A MEASURING ARRANGEMENT

STATEMENT REGARDING FEDERALLY SPONSORED RESEARCH OR DEVELOPMENT

No federal government funds were used in researching or developing this invention.

CROSS REFERENCE TO RELATED APPLICATIONS

This patent application claims priority to German Patent Application 10 2017 121 923.4, filed on Sep. 21, 2017.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a measuring arrangement with a control unit and method for operating such a measuring arrangement.

Background of the Invention

In technical process automation, field devices are frequently used, which serve to detect and/or influence process variables. Examples for such field devices are fill gauges, limit gauges, and pressure measuring devices with sensors, which detect the respective process variables fill level, limit, or pressure. Frequently such field devices are connected to superordinate units, for example guidance systems or control units. These superordinate units serve for process control, process visualization, and/or process monitoring.

The energy and/or signal transmission between the field device and the superordinate units occurs frequently according to the 4 mA to 20 mA standard of prior art, in which a 4 mA to 20 mA current circuit and/or a two-wire line is formed between the field device and the superordinate unit. An analog measurement transmission occurs here by adjusting a current loop by the field device. In addition to the analog transmission of signals, the option is given for the measuring devices to transmit digital signals according to the HART-protocol and this way send other information to the superordinate unit or receive such information therefrom. According to the HART-protocol, digital information is superimposed over the analog current signal via frequency shift keying (FSK). Due to the fact that the FSK-modulation is zero mean, the additional signal has no influence upon the analog data transmission.

The energy supply of the field devices occurs in a direct connection of the superordinate unit and the field device also via the 4 mA to 20 mA current signal, so that both an analog as well as a digital signal path is possible.

In addition to a direct connection, the so-called multidrop operation allows under the HART-protocol the parallel connection of up to 15 field devices to one current loop. In the multidrop operation the communication occurs exclusively in a digital fashion and the amperage is set to 4 mA per field device. Here, no analog signal transmission occurs.

Based on the number of field devices connected in the multidrop operation, the energy supply unit of the measuring arrangement must provide amperage adjusted to the number of field devices, which is equivalent to 4 mA times the number of field devices.

An energy supply of the measuring arrangement occurs typically either via the superordinate unit or through a separately embodied energy supply unit.

In order to send and receive digital signals, a so-called communication resistor is provided by which the superordinate unit is connected at the input and the output side. The communication resistor is switched serially to the energy supply and converts the modulated current signals into a voltage signal and vice versa.

Depending on the number of field devices connected, a current, which may lie between 4 mA (one field device) and 60 mA (15 field devices) based on the number of field devices connected, flows through the communication resistor. In a typical capacity of the communication resistor of 250Ω, a voltage drop thus occurs at the communication resistor from 1 V (one field device) to 15 V (15 field devices).

Due to the fact that it is not known for the superordinate unit how many field devices are arranged or their respective voltage requirements in the measuring arrangement, sufficient voltage must be provided for the permitted maximum voltage of the field devices as well as the maximum number of field devices, and thus sufficient capacity for the maximally dropping voltage must be provided at the communication resistor. If fewer field devices are connected, this voltage is still applied and energy is wasted.

This condition is considered disadvantageous and it is particularly disadvantageous in battery-operated devices.

The objective of the present invention is to further develop a measuring arrangement with a control unit, an energy supply unit for a plurality of two-line field devices, applying a predetermined current to a measuring loop in which each of the field devices is arranged, with the two-line field devices being connected electrically parallel to the energy supply unit and digitally communicating with the control unit such that they can be operated in an energy-saving fashion.

Further, an objective of the present invention is to provide a method for operating such a measuring arrangement.

This objective is solved in a measuring arrangement having the features of claim 1 as well as a method having the features of claim 10. Advantageous further developments are described in the dependent claims.

BRIEF SUMMARY OF THE INVENTION

In a preferred embodiment, a measuring arrangement (1) comprising a control unit (3), an energy supply unit (5) for a plurality of two-line field devices (7), which apply a predetermined current (I) upon a measuring loop (9) in which the two-line field devices (7) are respectively arranged, with the two-line field devices (7) being electrically connected parallel to the energy supply unit (5) and digitally communicate with the control unit (3), characterized in that the energy supply unit (5) comprises a voltage controller (6) and the measuring arrangement comprises means for determining a number (n) of two-line field devices (7) operated in the measuring arrangement (1), and controls the output voltage ($U_{out}$) as a function of the number (n).

In another preferred embodiment, the measuring arrangement (1) as described herein, characterized in that the energy supply unit (5) is integrated in the control unit (3) or a modem (11) connected thereto.

In another preferred embodiment, the measuring arrangement (1) as described herein, characterized in that the energy supply unit (5) is embodied as a separate feeding device.

In another preferred embodiment, the measuring arrangement (1) as described herein, characterized in that a communication resistor ($R_C$) is arranged between the energy supply unit (5) and the two-line field devices (7), via which a signal modulated on the measuring loop (9) is converted into a voltage that can be detected by the modem (11) and a voltage applied by the modem (11) can be converted into a corresponding current.

In another preferred embodiment, the measuring arrangement (1) as described herein, characterized in that the output voltage ($U_{out}$) is controlled such that sufficient minimum voltage ($U_{min}$) is applied to each measuring unit (71) to ensure flawless operation.

In another preferred embodiment, the measuring arrangement (1) as described herein, characterized in that the output voltage ($U_{out}$) is controlled depending on a total current ($I_{total}$) required by the field devices (7).

In another preferred embodiment, the measuring arrangement (1) as described herein, characterized in that the number (n) of connected field devices (7) can be adjusted.

In another preferred embodiment, the measuring arrangement (1) as described herein, characterized in that the control unit (3) is battery operated.

In another preferred embodiment, the measuring arrangement (1) as described herein, characterized in that the control unit (3) and the field devices (7) communicate pursuant to the HART-multidrop protocol with frequency shift keying (FSK).

In another preferred embodiment, a method for operating a measuring arrangement (1) comprising a control unit (3), an energy supply unit (5) for a plurality of two-line field devices (7), which apply a predetermined current (I) to a measuring circuit (9) in which the two-line field device (7) are respectively arranged, with the two-line field devices (7) being connected electrically parallel to the energy supply unit (5) and digitally communicate with the control unit, characterized in that an output voltage ($U_{out}$) of the energy supply unit (5) is controlled depending on the number (n) of field devices (7) connected to the energy supply (5).

In another preferred embodiment, the method for operating a measuring arrangement (1) as described herein, characterized in that the measuring arrangement (1) initially adjusts the maximum output voltage ($U_{out}$), determines a number (n) of field devices (7) located in the measuring arrangement (1) by measuring the current, and then the output voltage ($U_{out}$) is set to an adjusted value.

In another preferred embodiment, the method for operating a measuring arrangement (1) as described herein, characterized in that a required output voltage ($U_{out}$) is determined via an inquiry of the necessary minimum voltage ($U_{min}$) of the field devices (7) connected and then the output voltage ($U_{out}$) is adjusted such that at the field devices (7) the highest minimum voltage ($U_{min}$) is applied.

In another preferred embodiment, the method for operating a measuring arrangement (1) as described herein, characterized in that the number (n) of connected field devices (7) and/or the minimum voltage ($U_{min}$) are cyclically checked and the output voltage ($U_{out}$) is adjusted.

DETAILED DESCRIPTION OF THE INVENTION

The invention is a measuring arrangement comprising at least a control unit, an energy supply unit for a plurality of two-line field devices, applying a predetermined current upon a measuring loop in which the field devices are respectively arranged, with the two-line field devices being electrically connected parallel to the energy supply unit and communicating digitally with the control device, is characterized in that the measuring arrangement comprises means for determining a number of field devices operated in the measuring arrangement, particularly field devices connected to the energy supply unit, with the energy supply unit showing a voltage controller regulating the output voltage depending on the number.

Such a measuring arrangement allows control the output voltage of the energy supply unit based on the number of field devices connected and thus depending on the current required by these field devices. In a particularly simple embodiment, the current flowing through the communication resistor and/or a voltage dropping at the resistor are measured. When the resistivity of the communication system is known, conclusions can be drawn about the current and thus the number of field devices present. It is also possible to exclusively use the voltage drop at the communication resistor for regulating the output voltage.

Particularly beneficial is the use of the present measuring arrangement in field devices which are connected to the control unit in the so-called HART-multidrop mode. In this type of communication, each of the field devices applies a device current of 4 mA upon the measuring loop utilized thereby such that, depending on the number of connected field devices, additional resistors, particularly a communication resistor of the measuring device can be flown through by a multiple of the device current, particularly outside the parallel circuitry of the field devices. Accordingly, more or less voltage drops at these resistors.

When the output voltage of the energy supply unit is controlled as a function of the number of field devices connected, in the event that less voltage drops in the additional resistors due to a lower applied current, energy can thus be saved.

Thus the energy supply unit can beneficially be integrated in the control unit or a modem connected thereto, or be embodied as a separate feeding unit.

When integrated in the control unit or the modem a particularly simple design is yielded, because fewer separate devices need to be installed.

If the energy supply unit is embodied as a separate feeding device, the design of the control unit and/or the modem can be simplified accordingly. The devices therefore become more economical.

In order to allow communication between the field devices and the control unit, it is necessary to convert a current signal modulated upon the two-wire line into voltage. For this purpose a communication resistor is arranged between the energy supply unit and the field devices. It converts the signal modulated upon the measuring loop into a voltage that can be detected by the modem, and a voltage applied by the modem into a corresponding current. The resistivity of the communication system and the amperage flowing through it must be considered for the control of the output voltage.

In order to ensure flawless operation of the field devices, the required minimum voltage must be provided to them, which is, however, dependent on the respective field device. In many measuring arrangements the minimum voltage amounts to 14 V, however it may also amount to 9.6 V or a different voltage, depending on the field devices used. It is therefore constantly attempted to develop devices which use as little voltage as possible. Based on the information regarding the respectively given measuring arrangement, the output voltage can be controlled in a manner such that voltage is applied to each sensor which is sufficient for flawless operation.

As already mentioned, the field devices are typically operated in the suggested measuring arrangement with a current of 4 mA. It may vary, however, depending on the respective application. Advantageously, the output voltage is therefore controlled depending on the current required by the field devices.

In an alternative embodiment, the output voltage can be controlled depending on an adjustable number of connected field devices. Thus a current measurement can be waived and the field device can be embodied in a respectively simpler fashion.

The present invention is particularly suited for battery operated measuring arrangements, since in these energy savings by way of voltage control provide particularly important advantages. Field devices such as level meters for rivers or overflow basins, or snow level meters for the alpine region frequently exhibit no wired energy supply units, and are thus battery operated. When energy savings can be achieved for such devices, their lifespan is lengthened, which allows less frequent battery changes and perhaps longer maintenance intervals. The operation of the devices is therefore possible in a much more cost-effective fashion.

The present invention is particularly suited for measuring arrangements in which the control unit and the field devices communicate according to the HART multidrop protocol via frequency shift keying (FSK). The HART multidrop protocol provides that the field devices are respectively arranged in a 4 mA current loop and connected parallel to the control unit. An energy supply unit may be arranged inside the control unit itself in a HART-modem coupled to the control unit, or in a feeding unit.

A method according to the invention for operating a measuring arrangement with a control unit, an energy supply unit for a plurality of two-line field devices, which apply a predetermined current to a measuring loop in which the field devices are respectively arranged, with the two-line field devices being connected electrically parallel to the energy supply unit and digitally communicating with the control device, is characterized in that an output voltage of the energy supply unit is controlled depending on the number of field devices connected to the energy supply unit.

The method for operating the measuring arrangement can thus essentially be implemented in the control unit or the voltage supply such that in a first embodiment no changes are required in the field devices.

The method may provide that the energy supply unit initially adjusts the maximum voltage, determines a number of field devices located in the measuring device by way of current measurement, and then the output voltage is set for an adjusted value.

In this process it is initially ensured that sufficient supply voltage is available for all field devices connected. Due to the fact that each of the field devices in the suggested operating mode applies a predetermined current, particularly 4 mA, into its respective measuring loop, the total amperage 4 mA flowing from the energy supply unit is multiplied with the number of field devices connected. With the value of the communication resistor as well as potentially present additional resistors, using the total amperage, here the voltage dropping at the communication resistor can be calculated as well or alternatively measured such that the voltage applied to the field devices can be calculated.

$$U_{FD} = U_{out} - U_{RC} = U_{out} - I_{total} \times R_C$$

In the present formula $U_{FD}$ represents the voltage applied to the field devices $U_{out}$ represents the output voltage of the energy supply unit $I_{total}$ represents the total amperage applied by the field devices $R_C$ represents the communication resistor If, based on the current measurement, the overall current is known, and from the knowledge of the measuring arrangement the minimum voltage required for operating the field devices as well as the value of the communication resistor are known, the necessary output voltage can be calculated as follows:

$$U_{out} = U_{min} + U_{RC} = U_{min} + I_{total} \times R_C$$

In the present formula $U_{out}$ represents the output voltage of the energy supply unit $I_{total}$ represents the total current applied by the field devices $R_C$ represents the communication resistor $U_{min}$ represents the maximum minimum voltage required for flaw-less operation of the field devices.

In a further development of the method, the required output voltage can be determined through an inquiry of the required minimum voltage of the connected field devices, and then the output voltage can be adjusted such that the maximum determined minimum voltage is applied to the field devices.

The HART-protocol allows the manufacturers to render manufacturer-specific inquiries with manufacturer-specific commands. Thus it can be provided that in the method the minimum voltage required for the safe operation of a field device is inquired and then adjusted to the output voltage such that the maximum determined minimum voltage is applied at the field devices.

Further, the number of connected field devices and/or the minimum voltage of the field devices can be cyclically checked and the output voltage can be adjusted to the number of field devices connected. Thus it is also detected if in the meantime field devices have been connected without any notification to the superordinate unit and/or the energy supply unit.

Detailed Description of the Figures

Figure 1:
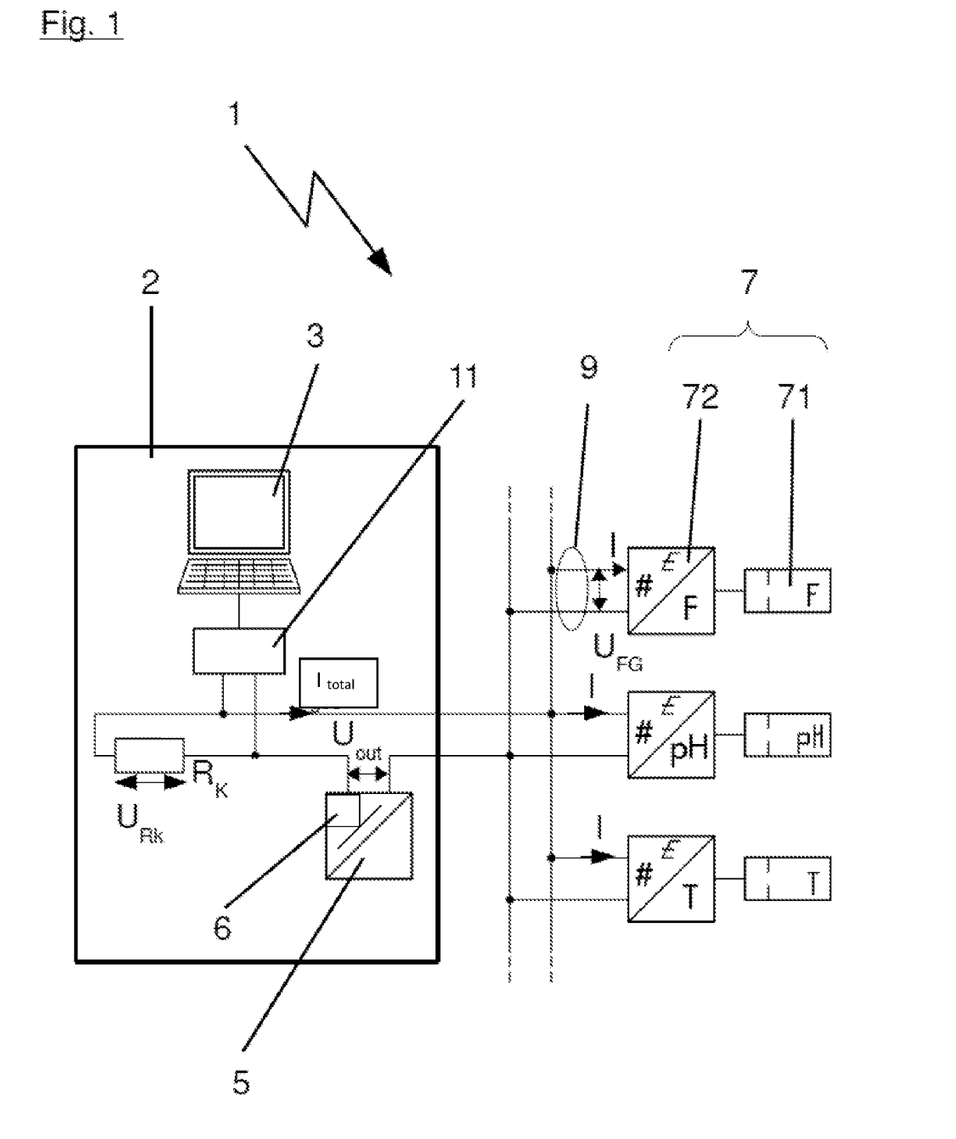
FIG. 1 is a line drawing evidencing a block diagram with a measuring arrangement according to the present invention.

FIG. 1 shows a block diagram of a measuring arrangement 1 in which a plurality of two-line field devices 7, hereinafter simply called field devices, are connected via the two-wire line electrically parallel to a superordinate unit 2. The superordinate unit 2 comprises in the present exemplary embodiment a control unit 3, a modem 11 connected to the control unit 3, which is connected to the two-wire line, and an energy supply unit 5 with a voltage controller 6.

The modem 11 is suitably designed in the exemplary embodiment for frequency shift keying (FSK) and connected via a communication resistor $R_C$ to the two-wire line. The communication resistor $R_C$ converts any digital signal modulated by the field devices 7 upon the two-wire line into a voltage that can be tapped by the modem 11. Inversely, a voltage applied by the modem 11 to the communication resistor $R_C$ is converted into a corresponding current signal and rendered available on the two-wire line.

The present measuring arrangement is a measuring arrangement for the HART multidrop operation in which the field devices 7 exchange data with the superordinate unit 2 in accordance with the HART-protocol and a constant current I of 4 mA is applied by each field device 7 upon its respective (sic). Due to the fact that, based on the HART multidrop operation, up to 15 field devices 7 can be connected parallel to the two-wire line, the total current $I_{total}$ rendered available by the energy supply unit may vary between 4 mA and 60 mA, depending on the number of field devices 7 connected.

The voltage supply unit 5 comprises in the present exemplary embodiment a voltage controller 6, which is suitably embodied to adjust an output voltage $U_{out}$ rendered available by the voltage supply 5 to a number n of field devices 7 connected to the two-wire line.

In the present exemplary embodiment, the field devices 7 respectively comprise a measuring device 71 as well as a HART-interface 72 and apply a constant current I of 4 mA upon the respective measuring loop 9 it is connected to. Depending on the respective measuring device 71 it requires a minimum voltage $U_{min}$ in order to ensure the correct operation of the field device 7. The voltage controller 6 can adjust the output voltage $U_{out}$ of the energy supply unit 5 such that a field device voltage $U_{FD}$ applied at the field devices 7 is equivalent to the minimum voltage $U_{min}$ required for the field devices 7, and the voltage drop at the communication resistor $R_C$, can be minimized based on the sum of the currents I applied by the field devices 7, thus based on the total current $I_{total}$.

In order to ensure reliable operation of all field devices 7, the respectively highest minimum voltage $U_{min}$ shall be used for determining the output voltage $U_{out}$.

This is explained in greater detail in the following figures.

Figure 2:
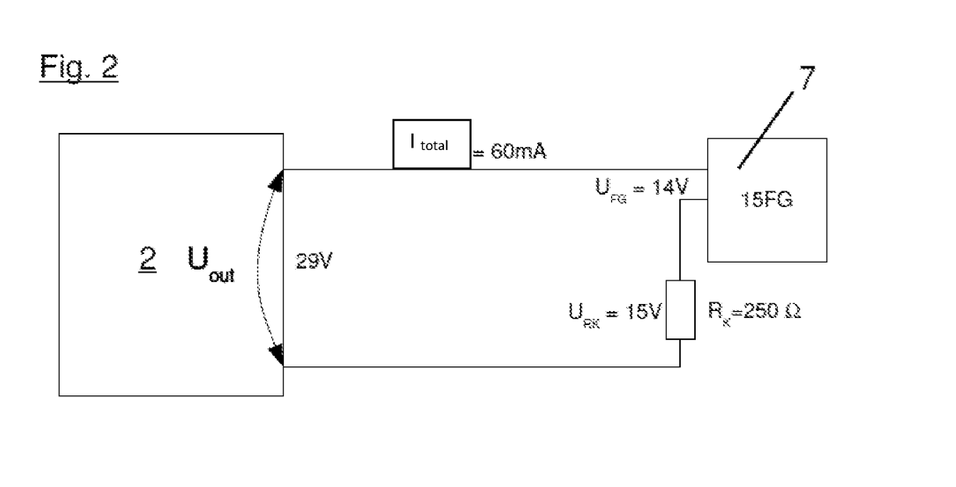
FIG. 2 is a line drawing evidencing a simplified block diagram of a measuring arrangement with 15 field devices connected.

FIG. 2 shows a simplified block diagram of the arrangement of FIG. 1, with a total of 15 field devices 7 being connected parallel to the superordinate unit 2, in the present case only shown in a single block. For the purpose of illustrating the present problem, the communication resistor $R_C$ is shown in the present exemplary embodiment not within the superordinate unit 2, but separately between the field devices 7 and the superordinate unit 2.

A minimum voltage $U_{min}$ for the correct operation of the field devices 7 is given in the present exemplary embodiment at 14 Volts, so that a voltage $U_{FD}$ applied at the field devices 7 is given with 14 Volts. Due to the fact that the 15 field devices according to the above description apply respectively 4 mA current to their respective measuring loop 9, the total current $I_{total}$, which in the present exemplary embodiment must be provided by the energy supply unit 5, must be 15×4 mA, thus 60 mA. Based on the total current $I_{total}$ of 60 mA, which, as shown in the present case, also flows through the communication resistance $R_C$, here showing a capacity of 250Ω, shows at the communication resistor $R_C$ a voltage drop of $U_{RC}$ with a value of $$U_{RC}=I_{total} \times R_C 60 mA \times 250\Omega = 15 V,$$

so that the energy supply unit 5 must provide an output voltage $U_{out}$ with a value of $$U_{out}=U_{FD}+U_{RC}=14V+15V=29V.$$

This means that for operating 15 field devices the energy supply unit 5 must provide an output voltage $U_{out}$ measuring 29 V.

Figure 3:
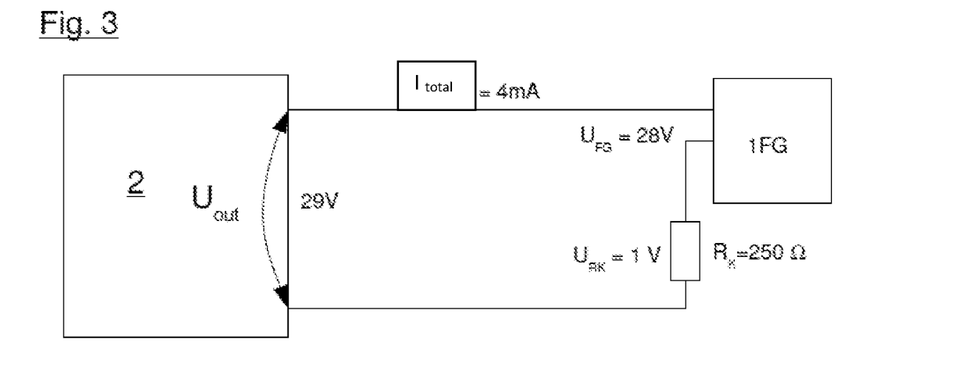
FIG. 3 is a line drawing evidencing the block diagram according to FIG. 2 with one field device connected according to prior art.

FIG. 3 is shown, similar to the arrangement 1 according to FIG. 2, with only one field device 7 being connected. Due to the fact that the superordinate unit 2 and/or the energy supply unit 5 have no information about the number of field devices 7 operated in the measuring arrangement 1, said arrangement in turn provides the output voltage $U_{out}$ measuring 29 V. The single field device 7 applies, as shown above, a current I measuring 4 mA upon the measuring loop 9, which in the given exemplary embodiment comprises only one field device 7, is equivalent to the total current $I_{total}$. According to the applied total current $I_{total}$ of 4 mA, at the communication resistor $R_C$ measuring 250Ω a voltage $U_{RC}$ of 1 V drops. Accordingly, the voltage applied at a field device 7 amounts to $$U_{FD}=U_{out}-U_{RC}=29V-1V=28V.$$

The voltage $U_{FD}$ applied at the field device 7, measuring 28 V, is therefore twice as high as it needs to be.

Figure 4:
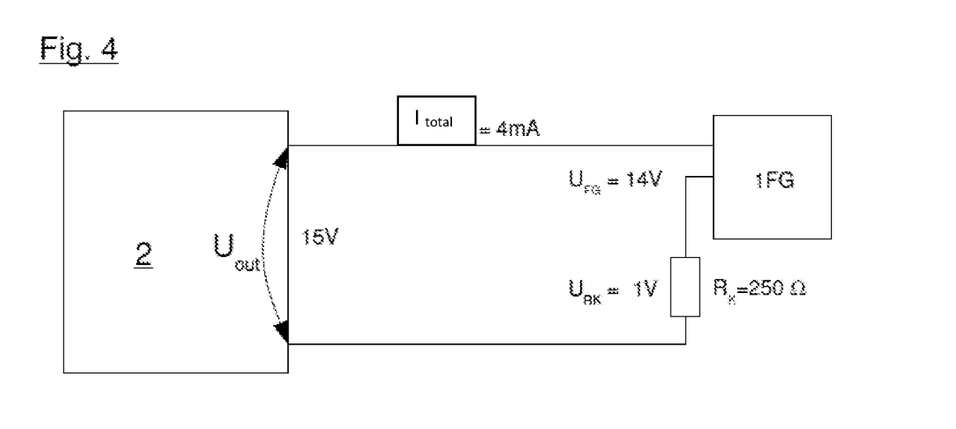
FIG. 4 is a line drawing evidencing the block diagram according to FIG. 2 with one field device connected according to the present invention.

FIG. 4 shows the measuring arrangement 1 of FIG. 3 in an embodiment according to the present application. According to the present application, the energy supply unit 5 is equipped with a voltage controller 6, and shows means suitable to detect a number n of connected field devices 7, and to adjust the output voltage $U_{out}$ of the energy supply unit 5 to the number n of connected field devices 7. In the present exemplary embodiment, by measuring the total current $I_{total}$, it is detected that only one field device 7 is operated in the measuring arrangement 1 and, based on the total current $I_{total}$ measuring 4 mA at the communication resistor RC, only a voltage $U_{RC}$ of 1 V drops. The knowledge that a flawless operation of the field device 7 requires a minimum voltage U min of 14 V allows the adjustment of the output voltage $U_{out}$ to a value of $$U_{out}=U_{FD}+U_{RC}=U_{min}+U_{RC}=14V+1V=15V.$$

This way, considerable energy savings can be achieved and the output voltage $U_{out}$ provided by the energy supply unit 5 can be considerably reduced.

Alternatively, the voltage dropping at the communication resistor $R_C$ can be measured and used for the above calculation.

Figure 5A:
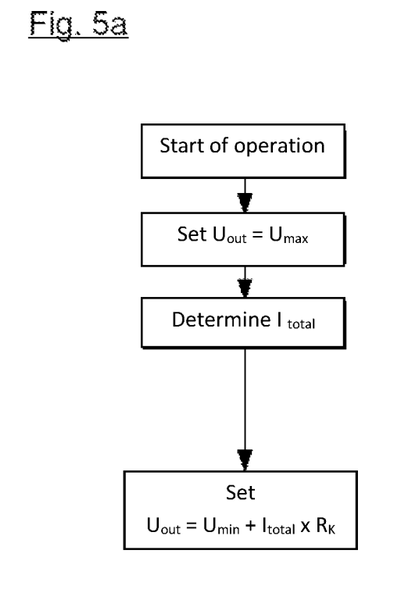
FIG. 5a, 5b are line drawings evidencing two variants of the method according to the present application with a current measurement.
Figure 5B:
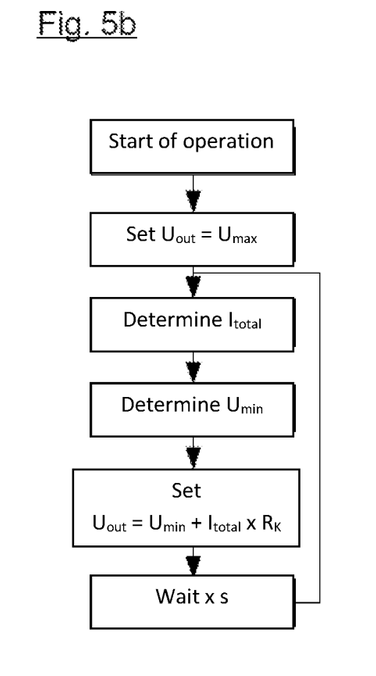

FIG. 5 shows the process of a potential method for operating a measuring arrangement 1 according to FIG. 4. In a first step, the measuring arrangement 1 is operated and subsequently the output voltage $U_{out}$ of the energy supply unit 5 is set to a maximum voltage $U_{max}$, which is maximally necessary for the measuring arrangement 1. In order to ensure the flawless operation of all field devices, even in case of a maximum quantity of field devices 7.

In the event that the voltage required by the field devices 7 for flawless operation, the minimum voltage $U_{min}$ is, for example, 14 V and the communication resistor $R_C$ is provided with a capacity of 250Ω, the maximum necessary voltage $U_{max}$ represents the voltage required for the maximum potential current loop, i.e. a total current $I_{total}$ for 15 connected field devices 7. In the above-shown examples this would therefore be $$U_{max}=U_{min}+R_C \times I_{total}=14V+250\Omega \times 15V=29V.$$

In case of different values of the minimum voltage $U_{min}$ or the capacity of the communication resistor $R_C$, the maximum voltage $U_{max}$ changes accordingly.

When all field devices 7 are in operation and apply the specified current of 4 mA per field device to the respective measuring loop 9, the total current $I_{total}$ is determined, such that the voltage $U_{RC}$ dropping at the communication resistor $R_C$ can be calculated. The output voltage $U_{out}$ is then set to the total of the highest minimally required voltage for flawless operation of the field devices $U_{min}$ and the voltage $U_{RC}$ dropping at the communication resistor $R_C$.

The variant of the method of FIG. 5a, shown in FIG. 5b, determines in addition to the total current $I_{total}$ also the minimum voltage $U_{min}$ for the flawless operation of the field devices 7 by an inquiry of the field devices 7. Here, the HART-protocol allows manufacturer-specific inquiries, by which, for example, a minimum voltage $U_{min}$ can be inquired about the operation of the respective field device 7. Once the minimum voltages $U_{min}$ of all field devices 7 have been inquired, the output voltage $U_{out}$ of the energy supply unit 5 is set to the total of the highest minimum voltage $U_{min}$ and the voltage $U_{RC}$ dropping at the communication resistor $R_C$. Further, another step is implemented that cyclically checks the number n of the field devices 7 operated in the measuring arrangement 1, with this in the present exemplary embodiment being implemented by waiting for a predetermined number of, for example 10, seconds and subsequently a renewed process of determining the total current $I_{total}$, determining the minimum voltage $U_{min}$, as well as adjusting the output voltage $U_{out}$. The time elapsed until processing another cycle may range from a few seconds to several days.

Such a cyclical post-regulation may also occur in all of the exemplary embodiments shown here.

Figure 6:
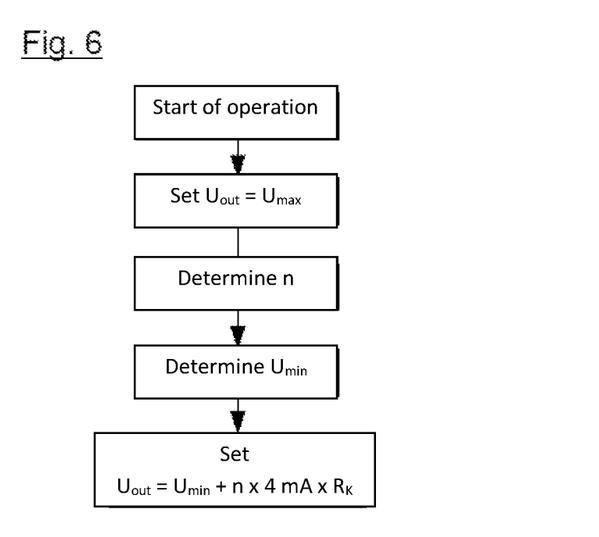
FIG. 6 is a line drawing evidencing a third variant of the method according to the present application.

FIG. 6 shows a third variant of the method for operating a measuring arrangement 1 according to the present application.

After the start of operation, in this case the output voltage $U_{out}$ is also set to the maximum output voltage $U_{max}$. Subsequently, the number n of the field devices 7, operated in the measuring arrangement 1, is, for example, determined by inquiring the issued device addresses in the measuring arrangement 1. Further, by a manufacturer-specific inquiry explained in reference to FIG. 5b, the minimum voltage $U_{min}$ for the flawless operation of the field devices 7 is learned, and the value of the output voltage $U_{out}$ is subsequently adjusted to the value of the highest minimum voltage $U_{min}$ plus the voltage $U_{RC}$ at the communication resistor $R_C$. The voltage $U_{RC}$ dropping at the communication resistor $R_C$ is calculated in the present exemplary embodiment from the number n of field devices 7 operated in the measuring arrangement 1 multiplied with the current of 4 mA applied by the field devices 7, in turn multiplied with the capacity of the communication resistor $R_C$.

$$U_{RC}=R_C \times I_{total}=R_C \times n \times 4mA$$

There is a plurality of potential embodiments for the measuring arrangement 1 according to the present invention as well as for the present method, without this deviating from the fundamental concept of the present invention, namely the reduction of the output voltage $U_{out}$ of the energy supply unit 3 of the measuring arrangement 1 depending on the number n of field devices 7 operated in the measuring arrangement 1.

When adjusting the voltage, the voltage dropping at the communication resistor must always be considered. The output voltage must thus be adjusted such that it is equivalent to the minimum voltage required for the field devices plus the voltage dropping at the communication resistor.

$$U_{out}=U_{min}+U_{RC}=U_{min}+I \times R_C$$

Resistivity is not considered in the above description, for reasons of simplification; however, it may also be relevant depending on the length of the wire. Resistivity is proportional to the length of the supply line so that the voltage dropping would have to be considered as follows:

$$U_L=I \times R_L=I \times R_L \times 1$$

LIST OF REFERENCE NUMBERS

1 Measuring arrangement
2 Superordinate unit
3 Control unit
5 Energy supply unit
6 Voltage controller
7 Two-line field devices/field devices
9 Measuring loop
11 Modem
71 Measuring device
72 HART-interface
I Current
$I_{total}$ Total current
$U_{FD}$ Voltage at the field device
$U_{out}$ Output voltage
$U_{min}$ Minimum voltage
$U_{max}$ Maximum output voltage The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A measuring arrangement comprising a control unit, an energy supply unit for a plurality of two-line field devices, which apply a predetermined current upon a measuring loop in which the two-line field devices are respectively arranged, with the two-line field devices being electrically connected parallel to the energy supply unit and digitally communicate with the control unit, wherein the energy supply unit comprises a voltage controller and the measuring arrangement comprises means for determining a number of two-line field devices operated in the measuring arrangement, and controls the output voltage as a function of the number.

2. The measuring arrangement according to claim 1, wherein the energy supply unit is integrated in the control unit or a modem connected thereto.

3. The measuring arrangement according to claim 1, wherein the energy supply unit is embodied as a separate feeding device.

4. The measuring arrangement according to claim 1, wherein a communication resistor is arranged between the energy supply unit and the two-line field devices, via which a signal modulated on the measuring loop is converted into a voltage that can be detected by the modem and a voltage applied by the modem can be converted into a corresponding current.

5. The measuring arrangement according to claim 1, wherein the output voltage is controlled such that sufficient minimum voltage is applied to each measuring unit.

6. The measuring arrangement according to claim 1, wherein the output voltage is controlled depending on a total current required by the field devices.

7. The measuring arrangement according to claim 1, characterized in that the number of connected field devices can be adjusted.

8. The measuring arrangement according to claim 1, wherein the control unit is battery operated.

9. The measuring arrangement according to claim 1, wherein the control unit and the field devices communicate pursuant to the HART-multidrop protocol with frequency shift keying.

10. A method for operating a measuring arrangement comprising a control unit, an energy supply unit for a plurality of two-line field devices, which apply a predetermined current to a measuring circuit in which the two-line field device are respectively arranged, with the two-line field devices being connected electrically parallel to the energy supply unit and digitally communicate with the control unit, characterized in that an output voltage of the energy supply unit is controlled depending on the number of field devices connected to the energy supply.

11. The method according to claim 10, wherein the measuring arrangement initially adjusts the maximum output voltage, determines a number of field devices located in the measuring arrangement by measuring the current, and then the output voltage is set to an adjusted value.

12. The method according to claim 10, wherein a required output voltage is determined via an inquiry of the necessary minimum voltage of the field devices connected and then the output voltage is adjusted such that at the field devices the highest minimum voltage is applied.

13. The method according to claim 10, wherein the number of connected field devices and the minimum voltage are cyclically checked and the output voltage is adjusted.

* * * * *